F. F. CHASE.
GRAVITY FRUIT SEPARATOR.
APPLICATION FILED APR. 14, 1917.
1,285,560.
Patented Nov. 19, 1918.
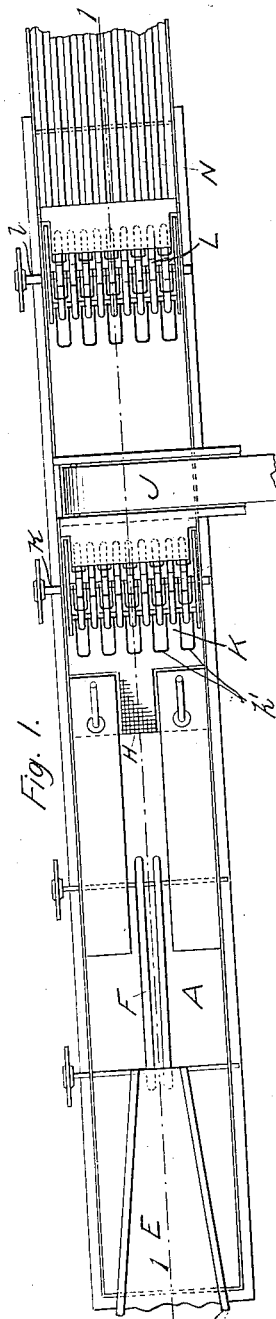
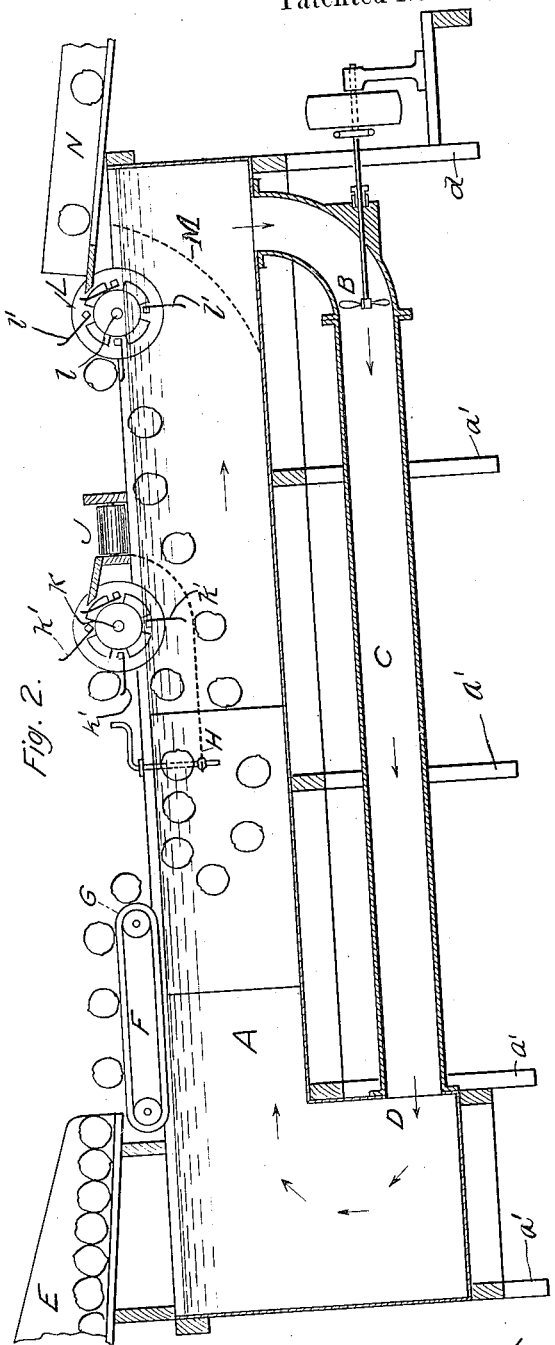

UNITED STATES PATENT OFFICE.

FRANK F. CHASE, OF RIVERSIDE, CALIFORNIA.

GRAVITY FRUIT-SEPARATOR.

1,285,560.

Specification of Letters Patent.

Patented Nov. 19, 1918.

Application filed April 14, 1917. Serial No. 162,820.

(DEDICATED TO THE PUBLIC.)

*To all whom it may concern:*

Be it known that I, FRANK F. CHASE, an employee of the Department of Agriculture of the United States of America, residing at Riverside, in the county of Riverside, State of California, (whose post-office address is Riverside, California,) have invented a new and useful Gravity Fruit-Separator.

This application is made under the act of March 3, 1883, chapter 143 (22 Stat., 625), and the invention herein described and claimed may be used by the Government of the United States or any of its officers or employees in the prosecution of work for the Government, or any person in the United States, without payment to me of any royalty thereon.

The object of my invention is to provide a simple, convenient and satisfactory machine for accurately separating frosted oranges, lemons and other citrus fruits from non-frosted fruits of the same kinds. From experiments I have ascertained that frozen oranges and lemons are much lighter in weight than those which have not been frozen. This difference in weight is occasioned by the effect of the freezing operation upon the fruit, which said operation reduces the amount of juice in the fruit and simultaneously dries out the tissues in the interior of the product, thus lessening the weight of the fruit. By experiments in placing the fruit in water I have discovered that the frosted fruit will remain or float along on the surface, while the heavier or sound fruit will sink below the level of the surface, and I have further discovered that, by dropping the fruit in a moving current of water, the frosted fruit will come to the surface and be carried along on the top of the current, and the sound or heavier fruit, sinking deeper than the lighter fruit, will be carried under water for a greater distance than the lighter fruit because of the action of the current on the heavier specimens. As a result of conducting experiments along these lines, I have evolved a machine which satisfactorily and automatically effects the separation of frosted from non-frosted fruit, which consists in placing the fruit in a moving current of water and providing suitable means for removing separately therefrom the frosted and non-frosted fruit.

The nature, characteristic features, and scope of my invention will be more readily understood from the following description, taken in connection with the accompanying drawing, forming a part hereof, wherein—

Figure 1 is a plan view of the mechanism employed in practising my invention;

Fig. 2 is a side view of the same.

Referring to the drawings, A represents a tank having supports, $a'$, adapted to hold it in an elevated position. The tank may be constructed of any suitable material and is employed for holding water which may be introduced into it from any convenient source. The tank, A, has a depressed or L-shaped section, D, at its front end. A pipe C, connects the opposite ends of said tank, for the purpose of providing a channel through which the water in the tank may flow from one end thereof to the other. The pipe runs underneath the tank, A, having its discharge end connected with the L-shaped section, D, a suitable distance above the bottom portion of said described section. Adjusted in the rear portion of the pipe, C, is a propeller wheel of the screw type, B, which is employed for forcing water through the circulating pipe, C, into the tank, A, for producing a moving current of water within the tank. Motion may be communicated to said propeller wheel, B, from any suitable source.

Fruit may be conveyed to and removed from the tank, A, by any well-known means. There are now in common use in fruit packing houses several types of devices which may be conveniently and satisfactorily employed for dropping fruit into the water within the tank, and removing it therefrom. I do not claim anything novel in employing devices for accomplishing these special objects. In practice, I place the fruit in a hopper, designated in the drawings as E, which is held in a fixed position a suitable distance above one end of the tank, A, and then pass the fruit singly onto the endless conveyer, F, which carries it to a point shown at G, a suitable distance above the water in said tank, A, where they are dropped automatically into the water. Secured to the frame work of the tank, A, and extending from one side thereof to the other, a suitable distance from the conveyer, F, is a screen, H, having an upwardly curved rear end. This screen is held in operative position below the surface of the water in said tank. Secured to the machine housing, and extending from one side thereof to the other, above the screen, H, is a revolving cylinder, K, having secured thereto a shaft k, carrying a series of fingers, k'. The cylinder, K, may be rotated by a power communicated to it from any convenient source. To the machine housing in the rear of the revolving cylinder, K, is secured a trough, J, for receiving the fruit as it is removed from the water. Secured to the machine housing, and extending from one side of the tank to the other, a suitable distance from the revolving cylinder, K, and a suitable distance above the surface of the water, is a second revolving cylinder, L, which has secured thereto a shaft, l, carrying a plurality of fingers, l'. The cylinder, L, may be also rotated by power obtained from any desired source. M designates a curved screen, secured in fixed position in rear of the cylinder, L, and extending upwardly from the bottom of the tank, A, to the water surface, and N indicates an inclined trough, secured to the machine housing in the rear of the said cylinder, L.

In practising my invention sufficient water is discharged into the tank, A, for effecting the separation of frosted from non-frosted fruit. The water, upon being discharged into the front part of the tank, flows to the rear portion of the tank, where it enters the circulating pipe, C, passing therethrough, and is discharged into the L-shaped section, D, of the front portion of the tank. As the water passes through the circulating pipe, C, impetus or force is communicated by action of the propeller wheel, B. The propeller wheel driving the water through the circulating pipe, C, causes it to reënter the tank, A, through the L-shaped section, D, in motion, having sufficient force to move or flow through the tank, A, proper. The depression or L-shaped section, D, of the tank, A, operates to calm or quiet the water as it is emptied in said L-shaped section from the pipe, C, so as to allow the water to rise and flow through the tank in a smooth and even current, thereby preventing the current from carrying the light fruit to a distance beyond and underneath the screen, H. I place the frosted and non-frosted fruit to be separated in the hopper, E, and allow the fruit to pass singly therefrom onto the endless conveyer, F, as stated hereinbefore, by means of which the fruit is carried to the point designated, G, where it is automatically dropped into the moving current of water into the tank, A. The lighter fruit, upon falling into the water, promptly comes to the surface and is carried forwardly by the current over one end of the screen, H. The curved end of the screen prevents the current from carrying the lighter fruit rearwardly. When the lighter fruit comes onto the screen, H, the current carries it forwardly until the fruit is intercepted by the fingers, k', which are adapted to turn in response to the turning movement of the shaft, k, secured to the revolving cylinder, K. The fingers, k', in revolution, pick up the frosted fruit singly as they come in contact with the fruit in the water, and convey the fruit rearwardly with the rotary motion of said cylinder. On the backward turning of the fingers, the fruit falls into the trough, J, where the same may be conducted to a suitable receptacle. While the lighter fruit is removed from the tank in the manner described, the heavier, or non-frosted, fruit having sunk deeper in the water by reason of its greater weight than the lighter, or frosted, fruit rise upwardly gradually until they touch the under side of the screen, H, and are carried forwardly with the moving current of water until it passes beyond said screen, where it rises almost to the surface and drifts along until intercepted by the fingers, l', secured to the shaft, l, which is carried by the revolving cylinder, L. The fingers, l', in turning, come in contact with the heavier, or non-frosted, fruit, and pick it up and carry the fruit upwardly and rearwardly in their rotary movement, dropping such fruit into the inclined trough, N, where it may be conducted to a suitable rack for drying.

From the foregoing description, it is readily apparent that, by properly adjusting the distance of the drop from the end of the conveyer, F, to the water in said tank, A, and the position and depth of the screen, H, a very accurate separation of frosted from non-frosted fruit can be made.

Any suitable motor power and connections for communicating motion to the hopper, E, conveyer, F, revolving cylinders, K and L, and the propeller wheel, B, may be employed.

I do not confine the mechanism herein described exclusively to the separation of frosted oranges and lemons, but the same may be employed with equally good results in the separation of any frosted citrus fruits.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus described my invention, I claim:

In a separator, a tank comprising means for the circulation of flotative liquid from one end to the other thereof, means for feeding fruit or other articles into said tank adjacent one end thereof, a separating screen longitudinally disposed below the top of said tank and terminating upwardly at a point intermediate the ends of said tank, means in advance of said upper screen end for removing separated articles from the liquid above said longitudinal position of said screen, and means at the top end adjacent the other end of said tank for removing the articles separated below said separating screen which rise to the surface at said end, and means to guide said latter articles to said last named removing means and for preventing the articles from being returned with the current to the forward end of the machine.

In testimony whereof, I affix my signature in the presence of two subscribing witnesses.

FRANK F. CHASE.

Witnesses:
J. H. D. Cox,
W. H. Davis.